US007174510B2

(12) United States Patent
Salter

(10) Patent No.: US 7,174,510 B2
(45) Date of Patent: Feb. 6, 2007

(54) INTERACTIVE GAME PROVIDING INSTRUCTION IN MUSICAL NOTATION AND IN LEARNING AN INSTRUMENT

(76) Inventor: Hal Christopher Salter, 11510 B Valencia Dr., Seffner, FL (US) 33584

(*) Notice: Subject to any disclaimer, the term of this patent is extended or adjusted under 35 U.S.C. 154(b) by 318 days.

(21) Appl. No.: 10/273,353

(22) Filed: Oct. 18, 2002

(65) Prior Publication Data

US 2003/0151628 A1 Aug. 14, 2003

Related U.S. Application Data

(60) Provisional application No. 60/347,554, filed on Oct. 20, 2001.

(51) Int. Cl.
*G06F 9/315* (2006.01)
*G09B 15/08* (2006.01)

(52) U.S. Cl. ...................... 715/709; 715/772; 715/773; 84/470

(58) Field of Classification Search ................ 715/716, 715/717, 719, 727, 728, 773, 956, 957, 970, 715/705–711, 772; 434/393, 379, 362, 430, 434/128, 81, 118, 218–233; 84/470–477
See application file for complete search history.

(56) References Cited

U.S. PATENT DOCUMENTS

| | | | | |
|---|---|---|---|---|
| 4,331,062 A | | 5/1982 | Rogers | |
| 4,366,741 A | | 1/1983 | Titus | |
| 4,416,182 A | | 11/1983 | Wise et al. | |
| 4,781,099 A | | 11/1988 | Koike | |
| 4,997,374 A | | 3/1991 | Simone | |
| 5,107,743 A | | 4/1992 | Decker | |
| 5,183,398 A | | 2/1993 | Monte et al. | |
| 5,219,291 A | | 6/1993 | Fong et al. | |
| 5,392,682 A | | 2/1995 | McCartney-Hoy | |
| 5,540,132 A | | 7/1996 | Hale | |
| 5,864,868 A | | 1/1999 | Contois | |
| 5,886,273 A | | 3/1999 | Haruyama | |
| 6,066,791 A | | 5/2000 | Renard | |
| 6,072,113 A | * | 6/2000 | Tohgi et al. | 84/470 R |
| 6,204,441 B1 | * | 3/2001 | Asahi et al. | 84/470 R |
| 6,252,153 B1 | | 6/2001 | Toyama | |
| 6,284,961 B1 | | 9/2001 | Kimmel, Jr. | |
| 6,337,433 B1 | | 1/2002 | Nishimoto | |
| 6,388,181 B2 | * | 5/2002 | Moe | 84/477 R |
| 6,414,229 B1 | | 7/2002 | Gaudet | |
| 6,555,737 B2 | * | 4/2003 | Miyaki et al. | 84/477 R |
| 6,660,922 B1 | * | 12/2003 | Roeder | 84/477 R |
| 6,740,802 B1 | * | 5/2004 | Browne, Jr. | 84/609 |
| 2001/0029829 A1 | * | 10/2001 | Moe | 84/478 |

* cited by examiner

*Primary Examiner*—Ba Huynh
(74) *Attorney, Agent, or Firm*—McDermott Will & Emery LLP

(57) ABSTRACT

A musical keyboard is connected to a computer. The computer implements a graphical user interface for teaching users to play the musical instrument. A computer readable music file, such as a MIDI file, is used to drive the creation of game objects that travel from a point of origination along a path toward a key of a virtual keyboard. In one form, when a user presses a key of the musical keyboard within a certain time window of arrival of the game object at the corresponding key of the virtual keyboard, the user is awarded with an audio presentation, a visual presentation and/or with game points. In a more structured learning mode, the game can be played with selectable, progressively more difficult challenges that the user masters on the road to proficiency.

14 Claims, 15 Drawing Sheets

| Header Chunk | | | | |
|---|---|---|---|---|
| Chunk Type | length | Data | | |
| 4 bytes (ascii) | 4 bytes (32-bit binary) | <-- *length* (= 6 bytes) --> | | |
| | | 16-bit | 16-bit | 16-bit |
| MThd | *<length>* | *<format>* | *<tracks>* | *<division>* |

| Track Chunk | | |
|---|---|---|
| type | length | Data |
| 4 bytes (ascii) | 4 bytes (32-bit binary) | <-- *length* bytes --> (binary data) |
| MTrk | <*length*> | <*delta_time*><*event*> ... |

FIG. 6

FF <*type*> <*length*> <*data*> where:

<*type*>
is a single byte, specifying the type of meta-event.
The possible range is 00-7F. Not all values in this range are defined, but programs must be able to cope with (ie ignore) unexpected values by examining the length and skipping over the data portion.

<*length*>
is the number of bytes of <*data*> following.
This is a variable length quantity
0 is a valid <*length*>

<*data*>
zero or more bytes of data

FIG. 7

INTERACTIVE GAME PROVIDING INSTRUCTION IN MUSICAL NOTATION AND IN LEARNING AN INSTRUMENT

CROSS REFERENCE TO RELATED APPLICATIONS

This application claims priority from and is related to U.S. Provisional Application Ser. No. 60/347,554, filed Oct. 20, 2001, entitled "AN INTERACTIVE GAME PROVIDING INSTRUCTION IN READING MUSICAL NOTATION", by inventors Hal C. Salter. The contents of the provisional application are hereby incorporated herein by reference in their entirety.

COPYRIGHT NOTICE

At least a portion of the disclosure of this patent document contains material that is subject to Copyright protection. The Copyright owner has no objection to the facsimile reproduction by any one of the patent disclosure, as it appears in the Patent and Trademark Office patent files or records, but otherwise reserves all Copyright rights whatsoever.

CROSS REFERENCE TO CD-ROM APPENDIX

This application contains an Appendix comprising (1) CD-ROM containing specifications of computer programs used to carry out the invention disclosed herein. The contents of the CD-ROM are described in more detail in paper Appendix A attached to this document. The contents of the CD-ROM are incorporated into this disclosure by reference in their entirety as if they were set forth completely within the text of this application.

FIELD OF THE INVENTION

The present invention relates generally to an interactive game, and more particularly to a process for interpreting or compiling MIDI or other standard music files into an interactive game that instructs its user in musical notation while playing the game.

BACKGROUND

MIDI technology has been a stable source of piano and music sequencing programs for editing, printing, playing and composing music for almost twenty years. Some early, relatively primitive music and piano tutorial programs, as well as some games, have resulted from this technology. For example, some types of computer aided instruction, including piano instruction, have been used in the home market for several years.

In the area of music instruction, the computer has been used, for the most part, to provide a student with an interactive view of musical notation, where the student can press a key on the accompanying electronic piano and it will light up the note, or the note will light up and a drawing will indicate which key he should press. Other systems have a series of lights or fingering illustrations to attempt to communicate to the user which key should be played next. These programs and systems, while allowing the student to practice and obtain feedback, generally fail to involve musical novices sufficiently, especially with regard to rhythm. Several typing tutorials have enjoyed great success using such methods, but piano and music tutorials have not been as successful, due to several significant problems inherent with the subject.

A major problem with these prior art learning systems is that they fail to take into account several important differences between learning to type and learning to play music. The first and most obvious difference is that musical notes cannot merely be played in a correct sequence, but must be played in a rhythmic pattern in relation to the notes before and after it. The correct timing of the notes is one of the most difficult aspects to teach in music, by any technique; and up to now few applications have been able to adequately address this challenge, and then only in isolation from other concepts. The second challenge is that most programs start with musical notation to teach a song to the user. Reading and understanding musical notation is a bit like reading Beowolf in the Old English, and it's roots are just as old. The five line staff originally represented a monk's hand in the Middle Ages, and has been adapted to deal with all the musical innovations since.

There is also the problem of a vertically oriented notational system originally designed to convey pitch for voice (hence the concepts of higher and lower). But on the piano, pitch is experienced horizontally (i.e. perpendicularly to the notation—left to right instead of lower to higher). This difference, while conceptually easy, is a difficult transition for students to make, both visually and experientially. The combined difficulty is such that fewer than 20 percent of all piano players are estimated to be able to read music fluently.

For the novice player, then, there are at least four additional challenges to learning the piano compared to learning to type. They must learn the keys to the piano, they must learn musical notation, the notation is perpendicular to their piano, and they must hit the right key(s) at the right time. The frustration at these simultaneous challenges causes most users to quit, and makes the task seems more like work than play.

Examples of prior patents in the general area of music instruction are outlined below. Each of these references is incorporated by reference in their entirety.

U.S. Pat. No. 4,416,182 to Wise, et al. discloses a keyboard teaching device for the self-instruction of a student of keyboard musical instruments. They system enables the student to correlate the positions of the keys on a musical instrument keyboard with the positions of the notes on a musical scale. A keyboard having a plurality of keys corresponding to the notes of a musical scale generate a first set of control signals in an initialization or set-up mode and key-note correlation signals in an instruction or game mode. There is at least one storage element storing a predetermined combination of logical signals providing a source for a pseudo random sequence of one or more notes over a predetermined range in the game mode. The system generates a second set of control signals in response to the actuation of one or more keys in either game mode and a mechanism for generating audio tones and displaying video images in accordance with the first and second sets of control signals enables a student to visually and audibly check his or her selection of one or more keys.

U.S. Pat. No. 5,183,398 to Monte, et al. discloses an apparatus and method for instruction of a student which includes interactive guidance of the student through a series of lesson frames. This disclosure provides the student with a keyboard having a plurality of keys corresponding to the notes of a musical scale and generates a key relation signal in response to each depressed or released key. A video display and an audio tone generator associated therewith enables the student to respond to the visually displayed images and audio tones by selecting one or more of the keys on the keyboard. The student is presented with a lesson frame representing an instructional activity requiring a response by the student on the keyboard. The student keyboard response is compared with a performance standard and an absolute performance evaluation result in generated. The absolute performance evaluation result is compared with an acceptable achievement level for the particular instructional activity and a next frame selection signal is generated. A next frame is selected for presentation to the student based upon the next frame selection signal.

U.S. Pat. No. 4,997,374 to Simone discloses a teaching device that includes a changeable two channel prerecorded program source, and a console unit including a work booklet. The first channel of the program source includes an audio program comprising a series of spoken words which are audibly reproduced by the console unit and the second channel includes a series of control signals which are operative for actuating lights adjacent prespecified words in the work booklet. The operation of the console unit is coordinated with the audio program so that lights are actuated adjacent to the words in the work booklet as the same words are audibly reproduced by a console unit. One embodiment of the device further includes a plurality of depressible user response buttons on the console unit for indicating responses to questions presented in the audio program.

U.S. Pat. No. 4,781,099 to Koike discloses a musical quiz apparatus that presents a question chord in sound and a trainee answers by depressing the keys of the chord constituting notes on the keyboard. The apparatus is capable of generating a plurality of different chord data respectively representing chords, and generates a question chord datum one at a time more or less randomly selected from among those different chord data and produces sounds of notes which constitutes a chord designated by the question chord data. When the answer is correct, points are added up and a next question chord is presented.

U.S. Pat. No. 5,392,682 to McCartney-Hoy discloses a computerized musical keyboard and a method for using same to play or to learn to play a piano. The computerized musical keyboard includes a piano keyboard connected to a computer. The computer is programmed to select from a music module a piece of music to be played on the piano and to generate a signal indicating the proper keys to be played, the correct sequence in which the keys are to be played, and the hand and finger to be used in striking each key, in order to play on the piano the piece of music selected.

U.S. Pat. No. 5,107,743 to Decker discloses a piano teaching aid having a panel designed to fit over the keys on an existing keyboard so that lights mounted on a panel having more than one color or shape may be located directly above the piano keys to be played. The lights have more than one color or shape in order to distinguish the hand which the user will use to play the piano. The panel also includes a finder window which displays an alphanumeric code which corresponds to a like code appearing next to the score of music to be played. A foot pedal advancing mechanism is used whereby the user can control the speed which the lights display the keys to be struck, using the Foot Pedal to advance one action. The display also can show the music to be played at a tempo set by the user automatically changing from action to action without using the pedal. The panel articulates so that it may be stretched in one or more places so that it can fit over various dimensions of keyboards without interfering with keys to be played.

U.S. Pat. No. 4,331,062 to Rogers discloses an apparatus for visually displaying music notes on a note display panel mounted on an electronic piano with a support arm. The electronic piano has a keyboard electrically coupled to an electronic circuit operable to produce an audio output in accordance with the depression of one or more keys. The arm is rotatable in a mount attached to the piano for movement about a first upright axis. A first motion limiting unit attached to the mount and arm limits the rotation of the arm about the piano. A second motion limiting unit attached to the panel and this arm limits rotation of the panel about an upright axis relative to the arm. A modified structure has the arm fixed to the piano. The panel has grand staff indicia coordinated with vertically disposed first light mechanisms corresponding to chord note information with a second light mechanism diagonally corresponding to ascending note scale information. A keyboard representation is located below the staff indicia. A third light mechanism associated with the piano key indicia of the keyboard representation is coordinated with the second light mechanism to provide visual information as to the keys depressed on the electronic piano. An electric circuit having on-off switches electrically couples the electronic piano with the first, second, and third lights so that the lights can be selectively operated. The electronic circuit has a switch assembly having a plurality of key signature switches operable to coordinate the first, second, and third lights with the piano keyboard in accordance with the key signature of the music that is played.

U.S. Pat. No. 4,366,741 to Titus discloses an electronic piano having a keyboard and an electronic piano circuit connected to a micro-processor used to control a CRT device to provide a video note display concurrently with the depression of one or more keys. A keyboard representation located adjacent the screen of the CRT device is associated with lights used to indicate the key or keys that are played. Manually operated controls cooperate with the micro-processor to allow the back clearing of the screen one note at a time, remove all the notes, retain all the notes, indicate sharp or flat mode of each note, and indicate the duration that a key is depressed by elongating the note on the screen. A metronome unit is used with the micro-processor to provide a visual beat marker on the screen that sequentially moves across the screen. A movable frame connects the CRT device to the piano.

U.S. Pat. No. 5,864,868 to Contois discloses a computer system and method for controlling a media playing device. The system provides a user interface for allowing a user access to media pieces stored in a media database. The interface is also for controlling a media playing device, like a player piano or movie playing video device, that is coupled to the computer to play the accessed or selected piece of media. In one embodiment there is a computer interface that allows a user to display only music that relates to a selected category, like jazz or classical music. Another embodiment allows the user to direct the media playing device to automatically play selected music pieces that are related to a selected music category. Another embodiment allows a user to direct the media playing device to automatically play selected music pieces that are related to the selected music composer or artist.

U.S. Pat. No. 6,204,441 to Asahi et al. discloses techniques for displaying musical information and particularly for visually displaying musical notes, beats and tempos using personal computers or game devices that run musical software programs. The disclosure teaches the use of different colors and different brightnesses to distinguish certain types of musical notation. It has a display screen which shows both base and treble clefs as well as the keyboard and timing indication.

U.S. Pat. No. 6,388,181 to Moe shows computer graphics animation, used with a live video interactive method for playing keyboard music while the user guides his fingers to the keys targeted by the animation with each key to be struck within one beat of time is designated by a colored "sprite".

U.S. Pat. No. 6,066,791 to Renard et al. shows a system for instructing the playing of a musical instrument, displaying an image on the display device, and instructing the student to focus on the image while preferably using a musical instrument to play the notes on the staff.

U.S. Pat. No. 5,540,132 to Hale shows techniques for teaching musical notation to children. Each note is associated with the distinctly identifiable color which is then associated with an object which naturally occurs in this color. They utilize cartoon characters which apparently enhances association within the mind of the child.

U.S. Pat. No. 6,337,433 to Nishimoto et al. shows an electronic musical instrument having performance guidance function, performance guidance method, and storage medium storing a program therefore with a plurality of display devices arranged in association with the performance operating elements, respectively, each comprising a pair of display elements corresponding to left and right hands of the player, respectively.

U.S. Pat. No. 6,284,961 to Kimmel, Jr. shows a system of musical notes with the notes being associated with a color and utilizes stickers for application to the keys of the musical instrument to correspond to the colors of the note which it plays.

SUMMARY OF THE INVENTION

The invention is related to a hand-eye coordination game which has the purpose of teaching one how to read musical notation and how to play a musical instrument such as the piano.

The invention simplifies musical notation into a grid, with pitch moving left (lower) to right (higher), parallel with the piano keyboard layout, and the dimension of time moving vertically.

In one embodiment, in the beginning phases of the game, the player will see game objects, representing notes of a song, rising from near the bottom of the screen toward the virtual piano keyboard, and their vertical relationship to each other shall be a representation of relative musical time. As these game objects approach the virtual piano keyboard, the corresponding piano key along that path is visually obvious, and the objective of the player is to hit the corresponding key on a musical keyboard at precisely the time the game object is located within a predefined hit window vis a vis the virtual keyboard. If the player strikes the correct key at the correct time, audio and visual feedback will reward the player.

The player's main task in the invention is to hit the corresponding piano key for as of the many moving objects as possible at the right time, repeating the challenge until they have reached a certain percentage of correctness and move up to the next level of complexity, and in doing so, subconsciously learn to play a song, and in the later levels, to recognize and read the sheet music.

BRIEF DESCRIPTION OF THE DRAWINGS

The objects, features and advantages of the system of the present invention will be apparent from the following description in which:

FIG. 6 illustrates the format of a track chunk of a MIDI file.

FIG. 7 illustrates the format of META events from a MIDI file.

DETAILED DESCRIPTION OF THE INVENTION

Figure 1:
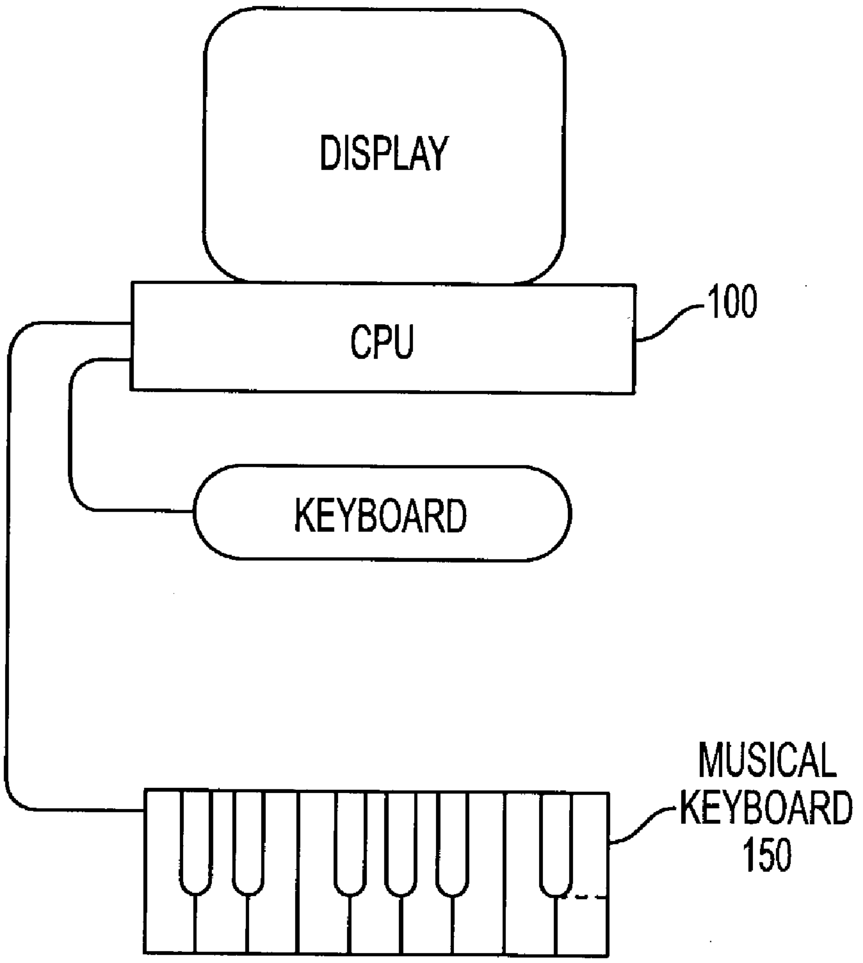
FIG. 1 is a block diagram of a hardware architecture for carrying out some aspects of the invention.

FIG. 1 is a block diagram of a hardware architecture for carrying out some aspects of the invention. FIG. 1 illustrates a computer 100 comprising a processing element (CPU) and a display. A typical implementation would be a personal computer commercially available from a number of sources. Details of the internals of computer 100 and its use in a network environment in FIG. 12.

A piano keyboard, 150, preferably having the capability of generating controlling data in accordance with the MIDI standard is connected to the computer through the user standard MIDI interface.

Figure 2:
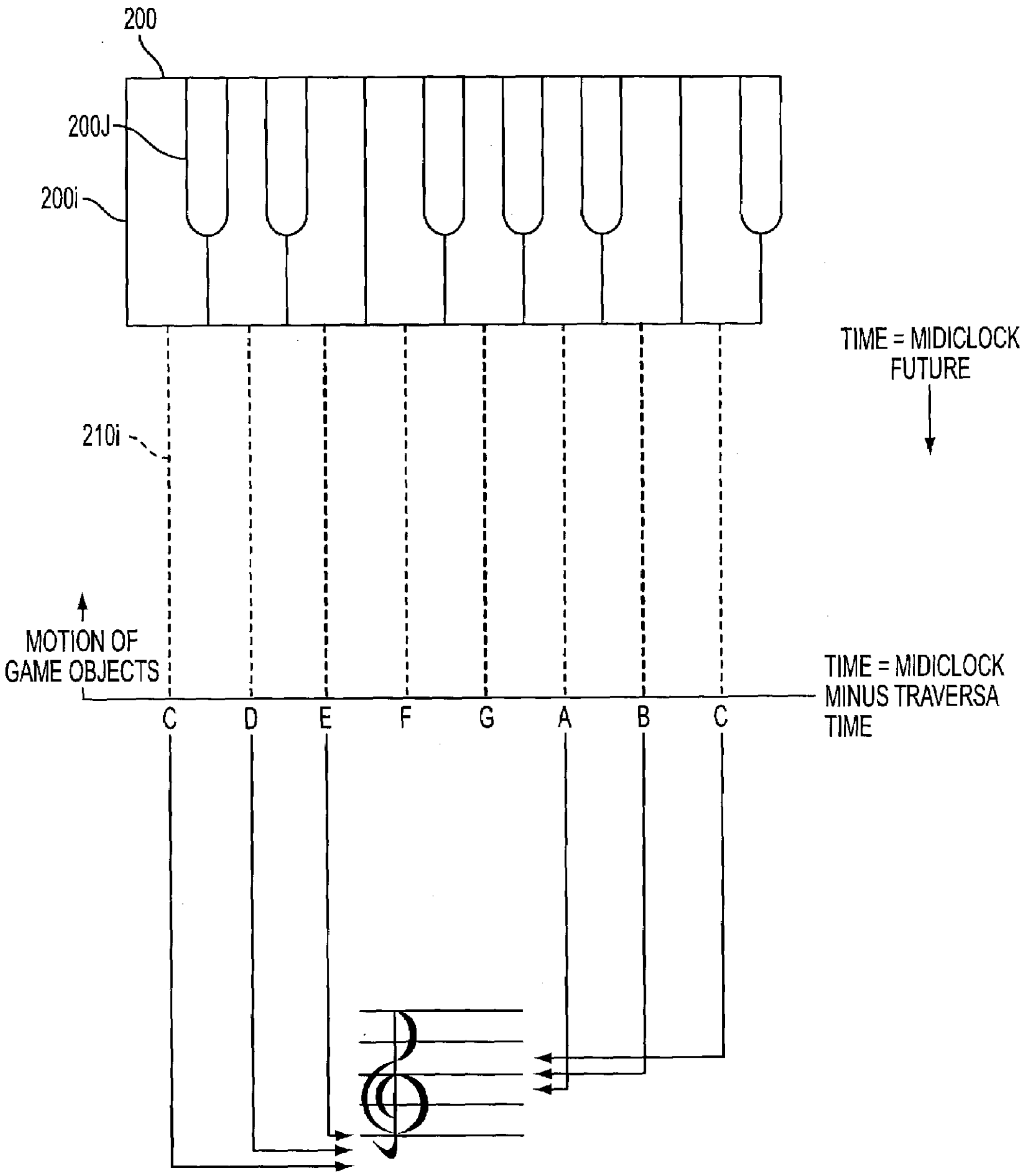
FIG. 2 is a diagram showing a virtual keyboard, game object trajectories and an exemplary relationship of those to a treble clef of a standard musical notation.
Figure 2A:
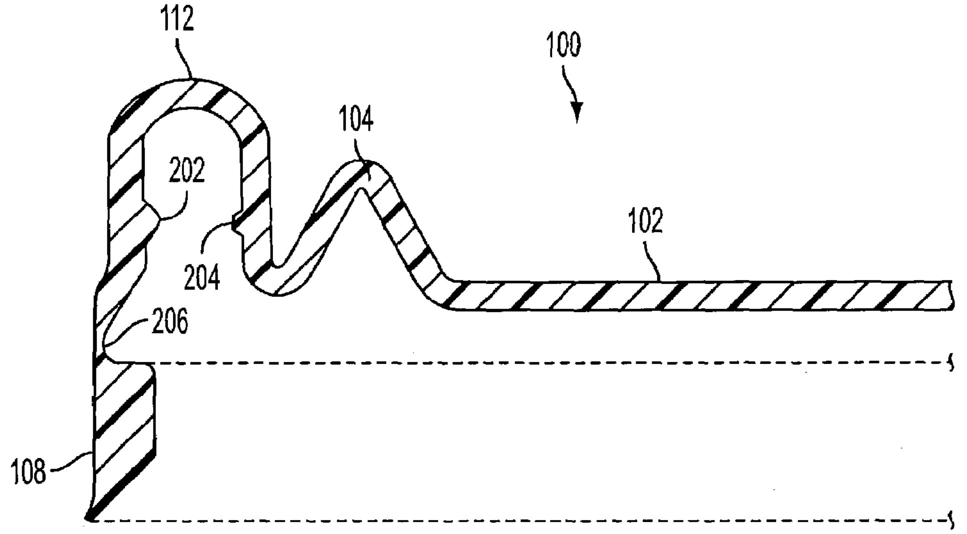

FIG. 2 is a diagram showing an exemplary virtual piano keyboard, game object trajectories and an exemplary relationship of those to a treble clef of standard musical notation. A virtual keyboard is an object that is shown on the screen of the computer's display as part of a graphical user interface. The virtual keyboard will comprise a plurality of individual keys 200*i* corresponding to the white keys of a piano and a plurality of keys 200*j* corresponding to the black keys of the piano. Thus, in this embodiment, the virtual keyboard represents the standard arrangement of keys on a keyboard such as a piano. Also associated with each key of the virtual keyboard is a trajectory 210*i* corresponding, in this example, to only the white keys of the piano keyboard. One of the white keys and an associated trajectory correspond to each of the notes of an octave of musical notation, in this case, starting with middle C on the left and progressing up the musical scale until reaching the C above middle C. Trajectories shown in bold correspond to those note found on a line of the treble clef in this example.

From this view, it is clear that pitch increases as one progresses up the musical scale from left to right as shown in this view. However, in standard musical notation, middle C begins on the line below the first line of the standard treble clef shown in FIG. 2 and the C above middle C is shown in the top most space of the standard treble clef. Thus, musical notation progresses in pitch on treble clef from bottom to top starting with low pitch value and increasing to higher pitch value. However, when viewed from a keyboard, pitch increases from left to right rather than from bottom to top. As noted above, this difference of representation creates at least one factor of difficulty in learning to play the piano.

As will be described more hereinafter, game objects are introduced at a location opposite the virtual keyboard along the trajectories 210*i*. Game objects then progress in animated fashion along the trajectory from near the bottom to the point where the game object encounters the key of the virtual keyboard 200*i*. There is associated with each of the trajectories a traversal time so that if three notes were introduced sequentially one after the other, they would become visible at the bottom of the trajectories appearing in a sequence, and progressing for the duration of the traversal time from bottom to top where they intersect their respective keys at respective instants of time displaced from one another.

One object of the interactive game is for a student to press the key of a (preferably MIDI) keyboard substantially at the same instants that the game objects intersects they key of the virtual keyboard on the graphical user interface. As the user plays the game, the user develops a certain facility for mapping the visual expression of the notes from a musical file which drive the generation of the game objects into actual fingering positions on a real keyboard which interfaces with a virtual keyboard. The game detects when the user presses the correct key at the proper moment.

Figure 3:
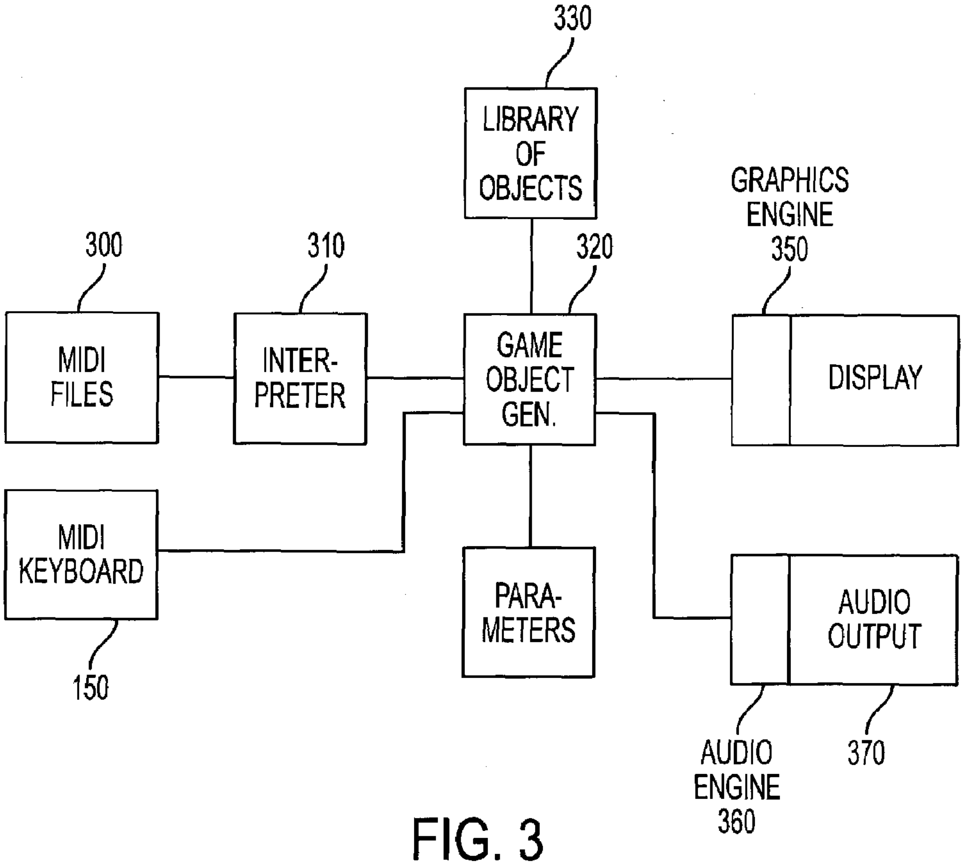
FIG. 3 shows a block diagram of exemplary hardware and software modules for carrying out the invention.

FIG. 3 shows a block diagram of exemplary hardware and software modules for carrying out various aspects of the invention. Although this particular embodiment of the invention is described with respect to the use of MIDI files and music formatted in accordance with a MIDI standard, other formats for music are well known and can be utilized in alternative embodiments of the invention.

In this exemplary embodiment, one or more files 300 formatted in a MIDI format are stored in, for example, a library, or downloaded in real time and fed to interpreter 310 where the MIDI data file is interpreted and translated in to commands which drive the game object generation module 320 which causes the display of game objects on the graphical user interface on the display screen and provides audio output 370 to the speakers of the computer. Conveniently, a graphics engine 350 and an audio engine 360 simplify the translation of game objects into audio and visual components driving the visual display and the audio output. The game object generator has access to a library of objects 330 and to a set of game control parameters 340. Each of these modules are described in more detail hereinafter.

Figures 4, 5:
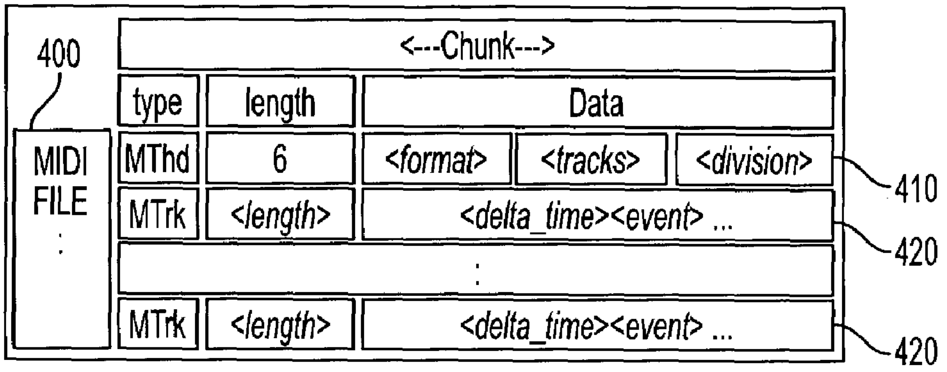
FIG. 4 illustrates the format of a MIDI file.
FIG. 5 illustrates the format of a header chunk of a MIDI file.

FIG. 4 illustrates the format of a MIDI file. As noted above, the MIDI file format is utilized for purposes of illustrating the invention, but the invention is not limited hereto. An example of another file suitable for carrying out the invention would be that of MPEG-4.

An understanding of a MIDI file and the operation of the MIDI protocol will greatly simplify understanding of the invention.

The MIDI File Format

MIDI files are structured into chunks. Each chunk consists of a 4-byte chunk type, a 4-byte indication of length indicating of the length of the bytes contained in the data field.

There are two types of chunks, namely header chunks (which have a chunk type of “MThd” (410)) and track chunks which have a chunk type of “MTrk” (420).

A MIDI file consists of a single header chunk followed by one or more track chunks.

FIG. 5 illustrates the format of a header chunk of a MIDI file. The header chunk comprises three fields, namely, chunk type, length and data. For a header chunk, the chunk type is MThd. The length field contains the length in bytes of the chunk data part. The “format” portion of the data field includes the MIDI file format which can be only formats 0, 1 and 2. The “tracks” portion of the data field as a binary number indicating the number of track chunks contained in the MIDI file. The “division” portion of the data field of the header chunk defines the default unit of “delta-time” for the MIDI file. If the most significant bit of the “division” field is a 0, the remaining 15 bits indicate the number of “ticks per quarter note” to be utilized in representing and reproducing the music. If the most significant bit is a logical 1, then there are two components indicated by the remaining 15 bits. Bits 8–14 would indicate the number of frames per second (indicated as a negative number) and the least significant 8 bits represents the number of ticks per SMTPE frame.

MIDI files come in three variations. Format 0 contains a single track. Format 1 contains one or more tracks which are all played simultaneously. Format 2 contains one or more independent tracks which can be or are played independently of the others.

FIG. 6 represents the format of a track chunk of a MIDI file. It comprises a chunk type which, by definition is a MTrk type and a length field which indicates the length of the data portion in the track chunk. The data portion of a track chunk comprises two elements. The first is a “delta_time” portion and “event” portion. delta_time is the number of “ticks” from the previous event and is represented as a variable length quantity. There are three types of events that are defined within the standard. They are a “MIDI event”, a “SYSEX event” and a “META event”. There are no explicit delimiters between the “delta_time” and “event” instances. This is possible because both fields have clearly defined lengths.

A MIDI event has any MIDI channel message. These include channel voice messages and channel mode messages. Messages other than MIDI channel messages to be included in a MIDI file can utilize the SYSEX event.

Most system exclusive messages are quite simple and are sent as a single packet of bytes, starting with F0 and ending with F7. However, some system exclusive messages are used to control device parameters in real time. Two different types of SYSEX events are defined to accommodate the different usages.

META events are used for things like track-names, lyrics and que points, which don’t result in MIDI messages being sent, but are still useful components of a MIDI file.

MIDI events have the general form shown in FIG. 7. MIDI events are preceded with the hexidecimal notation FF followed by a type field, a length field and a data field. The type field is a single byte specifying a type of META event. The length field contains a number of bytes of data following that field. The data field includes 0 or more bytes of data.

A number of META events have been defined in the standard that make implementation of the invention easier. These include the following:

A "sequence number" is an optional event which must occur only at the start of a track before any non-0 delta_time.

This is typically utilized to identify each track.

A text event is utilized for annotating a track with arbitrary text. A Copyright notice event can be utilized where a Copyright notice is represented in ACSI text. It should be the first event on the first track of a MIDI file.

A sequence/track name provides the name of a sequence or a track in the file. An instrument name, provides the description of the instruments used on the track. A lyric event provides the lyrics for a song. Normally, each syllable will have its own lyric-event, which occurs at the time the lyric is to be sung.

A marker event marks the significant point in the sequence such as the beginning of a verse.

A que point is utilized to include queues for events happening on-stage, such as "curtain rises", "exit", and the like.

An end of track event must be utilized to give the track a clearly defined length. This is essential if the track is looped or concatenated with another track.

A set tempo event sets the tempo in microseconds per quarter note. This means a change in the unit-length of the delta_time tick. The default tempo is a 120 beats per minute. A SMTPE offset event specifies the SMTPE time at which the track is to start. A time signature representing the standard time signature for a piece of music, such as 3/4 or 6/8 or 2/2. A key signature event can specify the number of sharps or flats and a major or minor flag. Finally, a sequence-specific META event allows a manufacture to incorporate sequencer specific directives into a MIDI file.

FIG. 7 illustrates the format of META events from a MIDI file.

Figure 8:
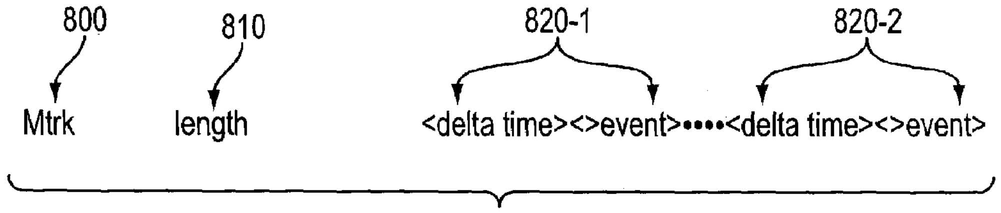
FIG. 8 is an example of a portion of a MTrk chunk of MIDI data together with exemplary semantics.

FIG. 8 is an example of a portion of an MTrk chunk of MIDI data together with exemplary semantics. As shown in FIG. 8, an MTrk chunk is introduced with an MTrk identifier 800 followed by a length field 810. The plurality of ordered pairs of delta_time and event fields 820-l through 820-j then follow which represent the individual MIDI messages associated with the MTrk chunk.

The MIDI protocol consists of messages which are designed to allow synthesizers and sequencers to communicate what-sound-to-play information. A typical MIDI message comprises three components. The first component begins with a hexidecimal 9 is followed by an identification of one of sixteen MIDI channels having a value of 0–F. The second component is a two byte sequence representing the key on the device that has been pressed. This corresponds to the notes of a keyboard that has been pressed in the case of a piano-type keyboard. The two byte value ranges from 00–7F. The third component of a MIDI message is the velocity component which specifies the velocity with which the key was pressed or released. It, too, ranges in value between 00 and 7F. Thus, if a musician pressed middle-C key on a keyboard, the keyboard would send a "note-on" message comprising: 90 3C 40. When the musician releases the key, the corresponding "note-off" message would comprise: 80 3C 33. In this case, the key was released more slowly than it was pressed as indicated by the velocity indication 33 in the release message (compared with the attack velocity 40).

Other MIDI messages may include a program (instrument) change, a pitch blend message, a control change message (e.g. pedal/switch foot change of state) and timing clock message.

MIDI messages are all one way. There are no acknowledgement messages sent from the receiver back to the transmitter. If a MIDI device does not know what to do with a message, it will ignore it. MIDI messages which are specific to a MIDI channel are referred to as channel messages. MIDI messages which affect the entire MIDI system or an entire MIDI device are known as system messages. Channel and system messages are further divided into several classes. The channel voice messages are messages which start, alter or stop a sound or sounds being played. Channel mode messages effect the entire channel. System realtime messages are those used by sequencers to regulate and synchronize timing. They do not contain data bytes. System common messages include messages such as song position pointer, song select and the like. System exclusive messages are generally used for device specific extensions to a MIDI protocol.

Since MIDI messages are sent and interpreted in realtime, it is desirable to reduce the volume of data that must be sent. For ordinary note-on and note-off messages, it is quite common for several notes to be turned off and on more or less at the same time. In such cases, it is possible to send a single status command, such as note-on followed by a plurality of "note identifier, velocity" pairs without repeating the same status byte for each note that is turned on or off. This reduction in the transmission of status bytes is known as "running status" within MIDI messages. Only the data bytes that change are sent.

Against the background of the MIDI File and protocol, an exemplary operation of that invention will now be described.

Figure 9:
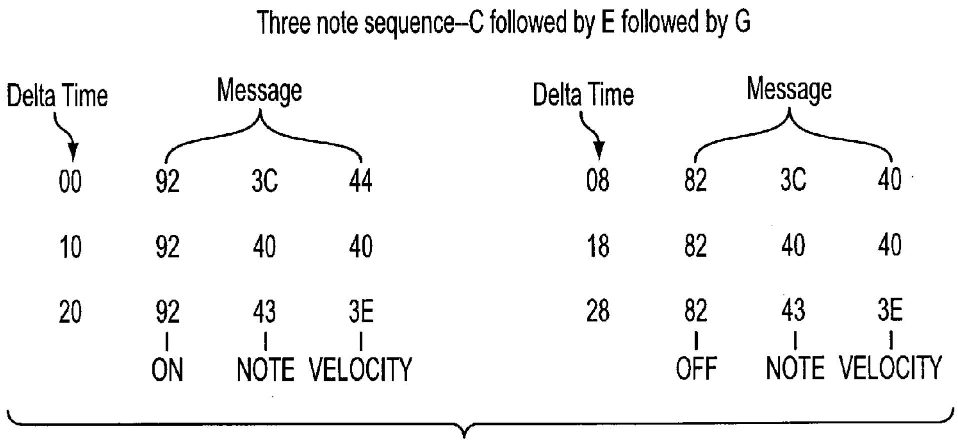
FIG. 9 illustrates an exemplary flow of data illustrating MIDI messages for the sequential playing of three notes.

FIG. 9 illustrates an exemplary flow of data illustrating MIDI messages for the sequential playing of three notes. In FIG. 9, two MIDI messages are shown per line. Each is introduced with a delta_time field. Thus, the six messages shown in FIG. 9 are preceded with delta_time increments of 00, 08, 10, 18, 20 and 28.

The delta_time increments are followed by a MIDI command sequence. The sequence 92 indicates the situation where a note is to be turned on. Following each 92 message is a message with a command field 82 which indicates that the note is to be turned off. Following each command is a note identifier. Which in the case of the first line indicates the note C is to be turned on and off. In the case of the second and third lines, the notes identified are the note E and the note G, respectively. The last component of each message is a velocity component. In the first line, the velocity 44 is a measure of how fast the key is pressed downwardly (e.g. attack velocity). In the following message, where the key is being released, the velocity 40 indicates that the key is released with a velocity 40.

Figure 10:
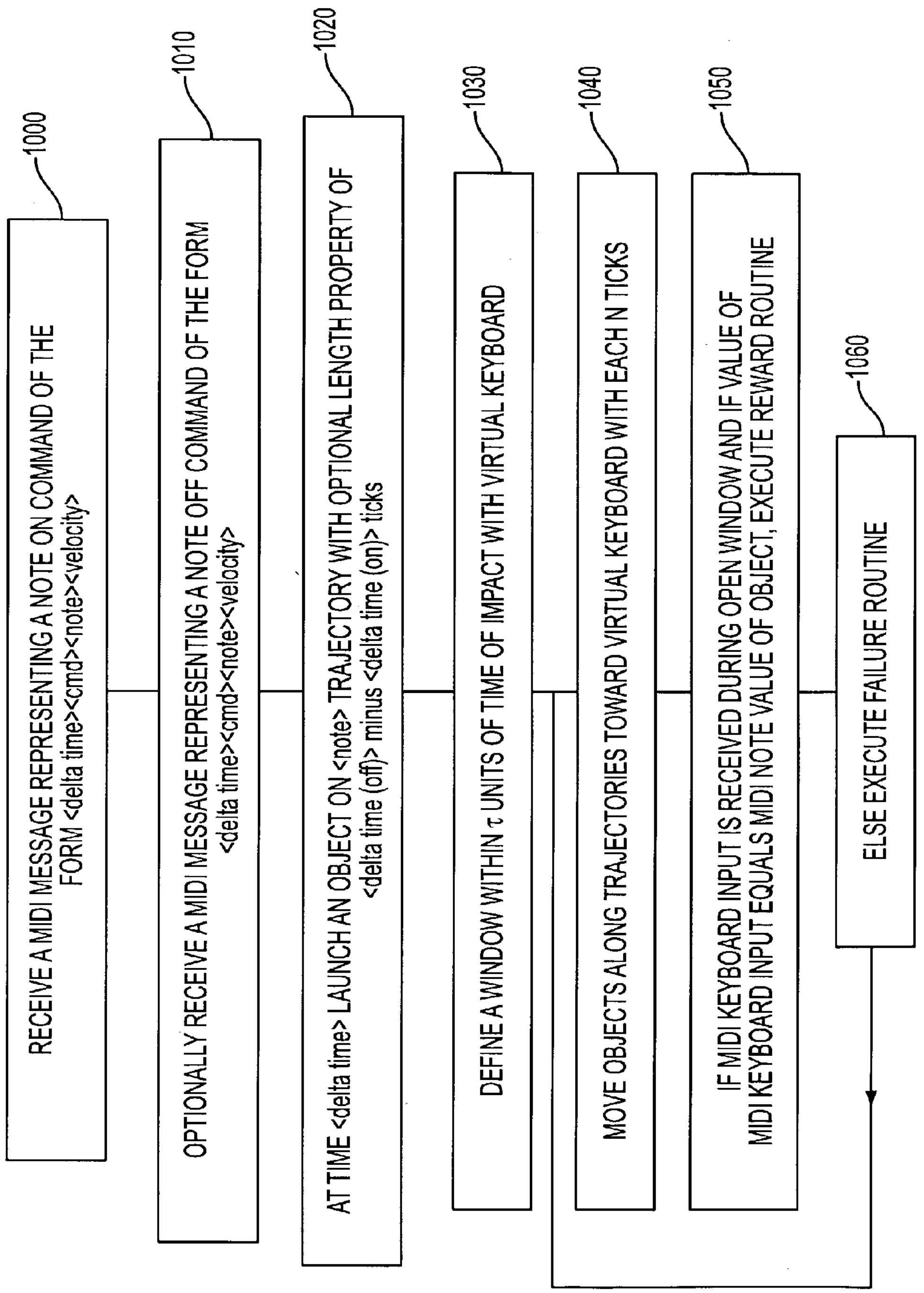
FIG. 10 is a flow chart of an exemplary process for interpreting the MIDI data stream of FIG. 5 for generating game objects for display.

FIG. 10 is a flow chart of an exemplary process for interpreting the MIDI data stream of FIG. 5 as part of generating game objects. When a MIDI message is received representing a note on object of the form <delta_time> <Command> <Note> <Velocity> (1000) optionally followed by a MIDI message representing a note-off property of similar format (1010). At time <delta_time> less traversal time, an object is launched on <Note> trajectory with optional length property of <delta_time (off)>–<delta_time (on)> ticks (1020). In this form, one can see that steps 1000–1020 represent an interpretation of the incoming MIDI messages followed by the generation of a game object.

Messages are received and interpreted on an ongoing basis in accordance with the steps 1000–1020. A window is defined within τ units of time of impact with the virtual keyboard (1030).

Once the object is launched on the note trajectory, the object is moved along the trajectory towards the virtual keyboard with each N ticks of the MIDI clock (1040). If MIDI keyboard input is received during an open window and if the value of the MIDI keyboard input equals the MIDI note value of the object about to impact the virtual keyboard, video and audio reward presentation (routines) are activated (1060). Otherwise, a video and audio sequence representing a failure can be activated. This process is repeated for each tick of the MIDI clock in an iterative fashion as indicated by the arrow going back to the top of step 1040.

Returning to FIG. 3, item 330 represents a library of objects which allow the game to be modified by the substitution of various types of objects for corresponding different flavors of the game. Examples of the types of objects utilized are given hereinafter. Also shown in FIG. 3 is a set of parameters 340 which allow a user to customize the performance of the game or the behavior of the game in certain instances.

The audio engine 360 is preferably based on Microsoft® DirectSound 8 application programming interface. The audio engine generally has the ability to play short .WAV files through the PCM channels of a sound card. The sound engine is implemented as a class with constructors, destructors, loading of a .WAV file and playing of a .WAV file. The sound engine is used primarily for playing sound effects associated with menu buttons, clicks, switches and game play feedback sounds. However, the invention could also work with other software engines.

The graphics engine 350 works in conjunction with the library of objects 330 and the game object generation module 320 to produce graphical objects on the screen that constitute respective implementations of the game objects utilized to play the game. The invention is capable of loading and playing three types of song files: MIDI, MIDI Karaoke, and .amm. The later is an internal song format described more hereinafter. Standard MIDI files were described above. The MIDI Karaoke file is essentially a standard MIDI file with song lyrics built into one of the tracks according to a certain format. The invention supports the .KAR file format which is a prevailing file format in the shareware/public domain markets.

An .amm file is very similar in structure to a standard type 1 MIDI file. However, the .amm format file will also hold annotations, highlighting and fingerings. Annotations are simple text notes that are stored on a song's timeline. These annotations can hold valuable information to a user and can be displayed during the game play along with other scrolling game objects. They may be stored as text in the internal file, but on the screen these are shown in the form as speech balloons with or without arrows pointing to other game objects.

Some notes in an .amm file can be highlighted. This is essentially a flag that tells the system that a note should be displayed with an enhanced video effect such as a halo effect around it. Fingerings are little clues to a user as to which finger should be used to play a note on a piano keyboard. Fingerings are assigned to individual notes and hold a number in a range from 1 to 5. During game play, game objects that have fingerings assigned will scroll along with the number placed on them.

Figure 11:
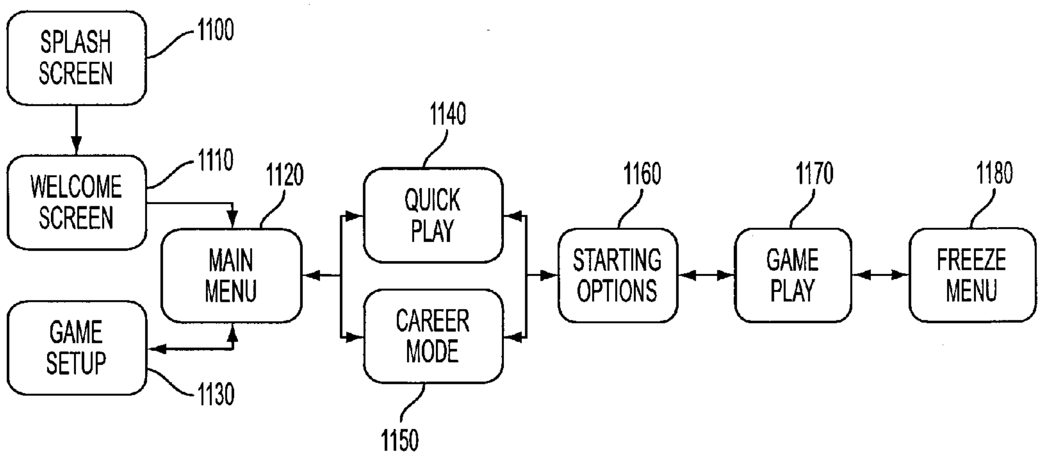
FIG. 11 is a block diagram showing an exemplary arrangement of game modules in accordance with one aspect of the invention.

FIG. 11 is a block diagram showing an exemplary arrangement of game modules in accordance with one aspect of the invention.

When a game is first loaded, a splash screen 1100 is displayed. This is centered on the desktop and enables the user to click on icons or links that would take them to the sponsoring company's website where they can download new songs for the game. Also, there may be a link to HTML documentation for the game.

The Welcome Screen 1110 allows four options. First, it allows selection of a main menu which is described hereinafter. Second, it allows access to an instant play mode of operation, described in conjunction with item 1140 hereinafter, which assumes all previously set up configurations of the last song played in the game. A third option from the main menu takes one to the credits screen where game credits are revealed in a visual way. Finally, the main menu 1120 has an option to exit the game and return to the operating system.

From the main menu 1120, there are three options. If a quick play option is selected, the user goes directly to the quick play mode described in conjunction with 1140 where the user can freely load any song, select a number of options and commence the practice. No profile needs to be selected or created. In the second main menu option, the career mode, a user will create a profile and will face a number of challenges, predefined within a number of levels and in a number of different piano methods. These are discussed in detail hereinafter in conjunction with career mode 1150.

Also from the main menu, a game set up 1130 may be selected. In game set up, a number of game objects can be configured as described more hereinafter.

Instant play 1140 allows the user to play the game without the hassle of going through start up options. While previous starting option parameters are assumed, including the last song played if the game was initially installed and no songs have been played yet, a default song is assumed. Instant play has no menu, it is just a short cut to the game play.

Figure 12:
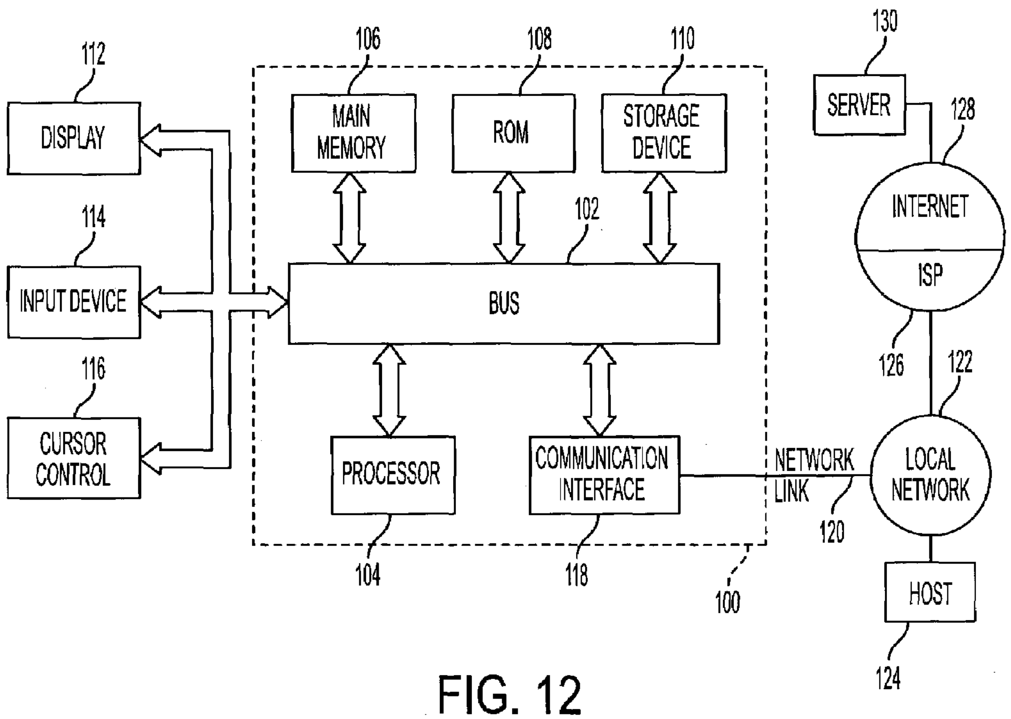
FIG. 12 is a block diagram of an exemplary computer that can be used to implement various aspects of the invention.

FIG. 12 is a block diagram showing details of an exemplary computer that can be used to implement various aspects of the invention. The description of the invention which follows is exemplary. However, it should be clearly understood that the present invention may be practiced without the specific details described herein. Well known structures and devices are shown in block diagram form in order to avoid unnecessarily obscuring the present invention. At least portions of the invention are intended to be implemented on or over a network such as the Internet. An example of such a network is also described in FIG. 12.

FIG. 12 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including, for example, alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

The present invention provides an interactive game that allows a more logical transition to learning musical notation. Specifically, the present invention involves a process for interpreting MIDI files into a computer video game, which can be generated with software for a personal computer or with hardware component that interfaces directly with a TV and MIDI keyboard. MIDI files storing musical notation and other information are used to generate unique game fields and objects whereby, game objects 1316 streams upward toward a virtual piano 1314 or graphic representing it. The game objects 1316 gradually convert to moving musical notation (a musical staff turned 90 degrees clockwise to put pitch axis parallel with piano) (see 1316 at FIG. 2). In this way, the target virtual piano and streaming graphic game objects (representing musical notes) are parallel to the player's input MIDI keyboard, allowing easy correlation with correct key.

The game interface 1310 later rotates counter-clockwise 90 degrees and morphs, into moving musical notation. Game objects 1316 are spaced proportionate to the melodic, harmonic and especially rhythmic structure to facilitate interpretation of relative rhythmic timing in game play. Game objects move toward the virtual piano 1314 in tempo of music, allowing visual and audio anticipation and precise rhythmic play by user. The virtual piano graphic 1314, the game objects 1316 and the MIDI keyboard keys can be color-coordinated to facilitate correlation of correct note with correct piano key. The game can keep tract of hits and misses, generating a score and a musical map for review, and allows game objects to be numbered for fingering clues.

Figure 13:
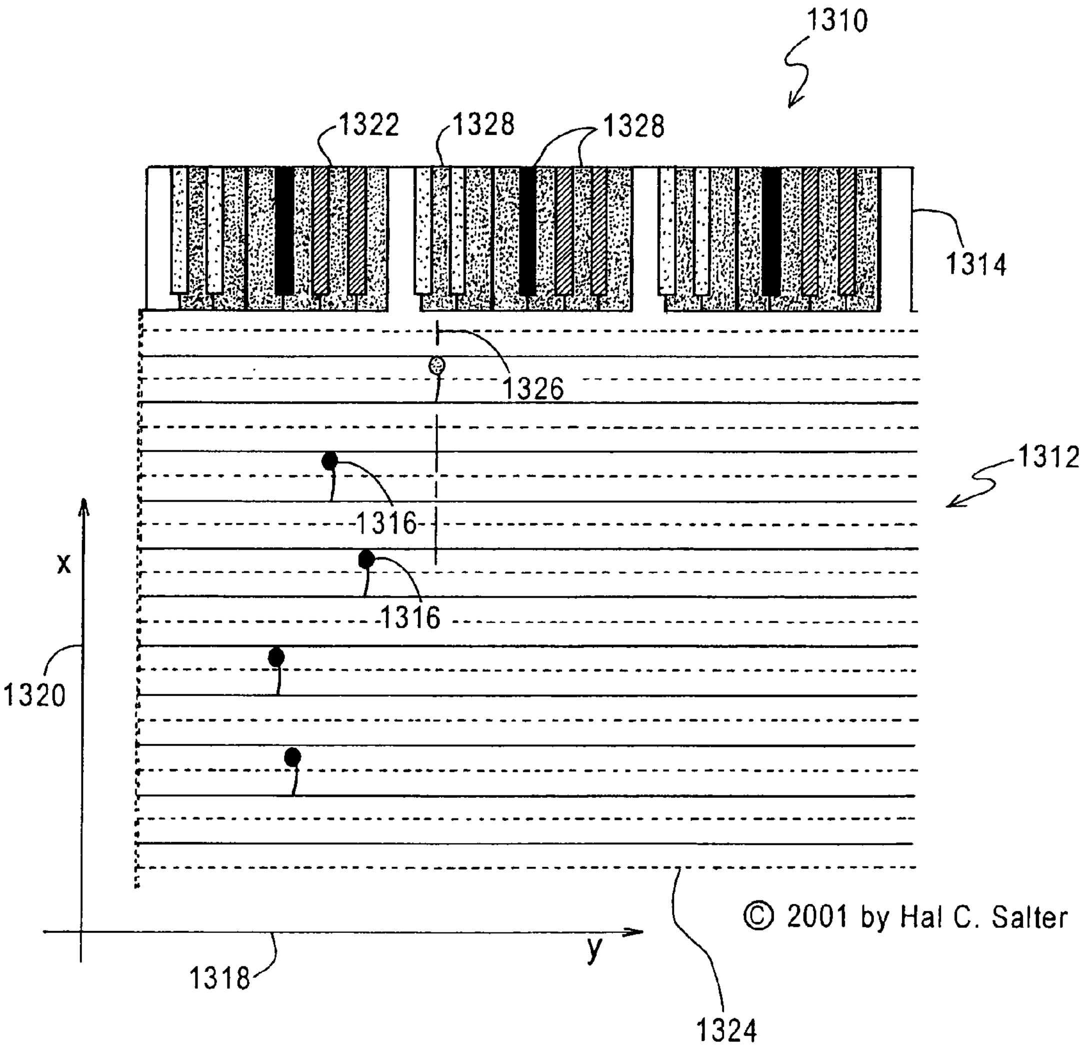
FIG. 13 shows an embodiment of graphical user interface (GUI) at first position, according to the present invention.

Referring to FIG. 13, a graphical user interface (GUI) 1310 is shown according to the present invention. In the game, there are several possible views of the interface 1310. The default should be a straight overview of the rectangular grid-based playing field 1312, with the virtual piano 1314 at the top of the screen, or interface 1310, and the game objects (notes) 1316 moving upward.

The underlying GUI logic will be that of objects 1316 moving upward along an invisible graph paper-like grid with the horizontal y-axis 1318 representing the pitch, (left=lower pitch, right=higher pitch ) and the vertical x-axis 1320 representing time (up=beginning of piece, down=end of piece) as subdivided by eighth notes or triplets or sixteenths, whichever is musically appropriate.

Along the top 1322 of the screen or interface 1310, or perhaps ¾s of the way up from the bottom 1324, with space above and below will be a virtual piano 1314 keyboard stretching horizontally across the screen. The grid panes (shown in broken lines at 1326) along the horizontal y-axis 1318 will exactly correspond one for one to each key 1328 on the virtual keyboard 1314.

The GUI 1310 of the present invention is thus a unique variation on the piano roll interface seen on some MIDI sequencer devices, which is, in turn, a variation on player piano rolls and music box construction.

Some key differences between the present interface 1310 and current piano roll interfaces are as follows. First, the interface 1310 of the present invention is turned 90 degrees, thus reading and moving from bottom 1324 to top 1322 instead of left to right to facilitate intuitive hard-eye coordination, resulting in a moving interactive piano tablature.

The present invention provides an interactive game that allows a more logical transition to learning musical notation. Specifically, the game simplifies musical notation into a grid of x and y, but with pitch moving from left (lower notes) to right (higher notes), parallel with the piano keyboard layout, and the dimension of time moving up from down (the bottom of the screen being the end of the piece). Thus, the game is played with two "pianos," one target virtual piano 1314 on the GUI, the other, an input keyboard. For example, an external matching MIDI piano keyboard (not shown) that plugs into a game port, and s positioned in front of a TV or monitor, could be used with the present invention.

At the beginning stages of the game, the virtual keyboard 1314 is on the top 1322 of the screen 1310. The notation is turned ninety (90) degrees clockwise and disguised as chromatically spaced graphic game objects 1316 moving upwards in a parallel stream toward the virtual piano 1314. By turning the underlying musical grid of pitch and time clockwise 90 degrees, the target virtual piano is also parallel with the user's electronic input keyboard.

In the beginning phases of the game, the player will see blocks or objects 1316 rising from the bottom 1324 of the screen 1310 toward the virtual piano 1314, and their vertical and horizontal relationships to each other shall be a representation of relative musical time and pitch. As these objects approach the virtual piano 1314, the corresponding piano key along that path will be visually obvious, and the object of the player is to hit the corresponding key on an MIDI compatible peripheral keyboard (or input keyboard) at precisely the time the block 1316 touches the key 1328 on the virtual keyboard 1314. The game objects 1316, the target virtual piano 1314 and input piano (e.g., MIDI keyboard) can be color-coded, the input keyboard with stickers or by design from the manufacturer. Thus, this game design combines the following graphic and feedback elements to create a completely new, efficient and fun means of teaching a user to play the piano and to read musical notation.

The game objects 1316 are spaced proportionally to the rhythm and pitch of the song to facilitate interpretation of relative timing in game play. The game objects 1316 moves smoothly toward the virtual piano 1314 or graphic in tempo with the music, allowing visual and audio anticipation of the correct rhythmic timing to enable precise game play.

It is noted that the dimension of time, carrying rhythmic information, flows graphically UPWARD, toward the virtual keyboard 1314 or graphic representing it positioned toward the top 1322 of the screen or monitor. This upward flow of game objects 1316 relative to the virtual piano 1314 allows the game to gradually return to classical musical notation without losing coherency for the user.

It is also noted that the game objects 1316, virtual keyboard 1314 and MIDI input keyboard keys can be color-coded to facilitate easy correlation with correct key. The interactive game can provide instant visual and/or audio feedback to let players know how they are doing. The game can also keep a detailed tally of score, hits and misses, providing a map of the game field for later review.

Figure 14:
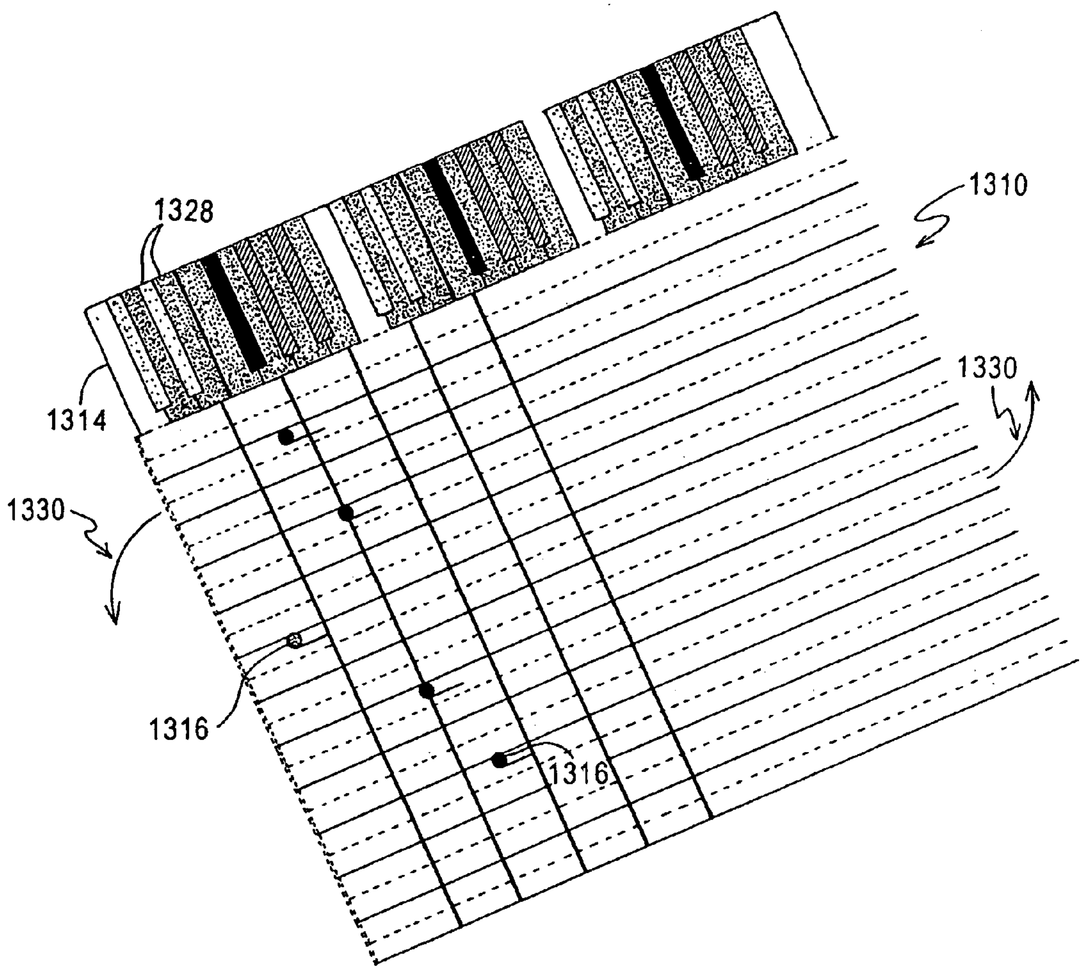
FIG. 14 shows the GUI of FIG. 13 as it is rotated into second position.

In FIG. 14, is shown the gradual counter-clockwise rotation (shown at 1330) of the interface 1310. This rotation can occur at later stages and levels of the game. Thus, as play progresses, the playing field gradually converts to traditional musical notation. As the playing field 1312 converts to traditional musical rotation, the underlying musical map of musical notation becomes apparent.

Figure 15:
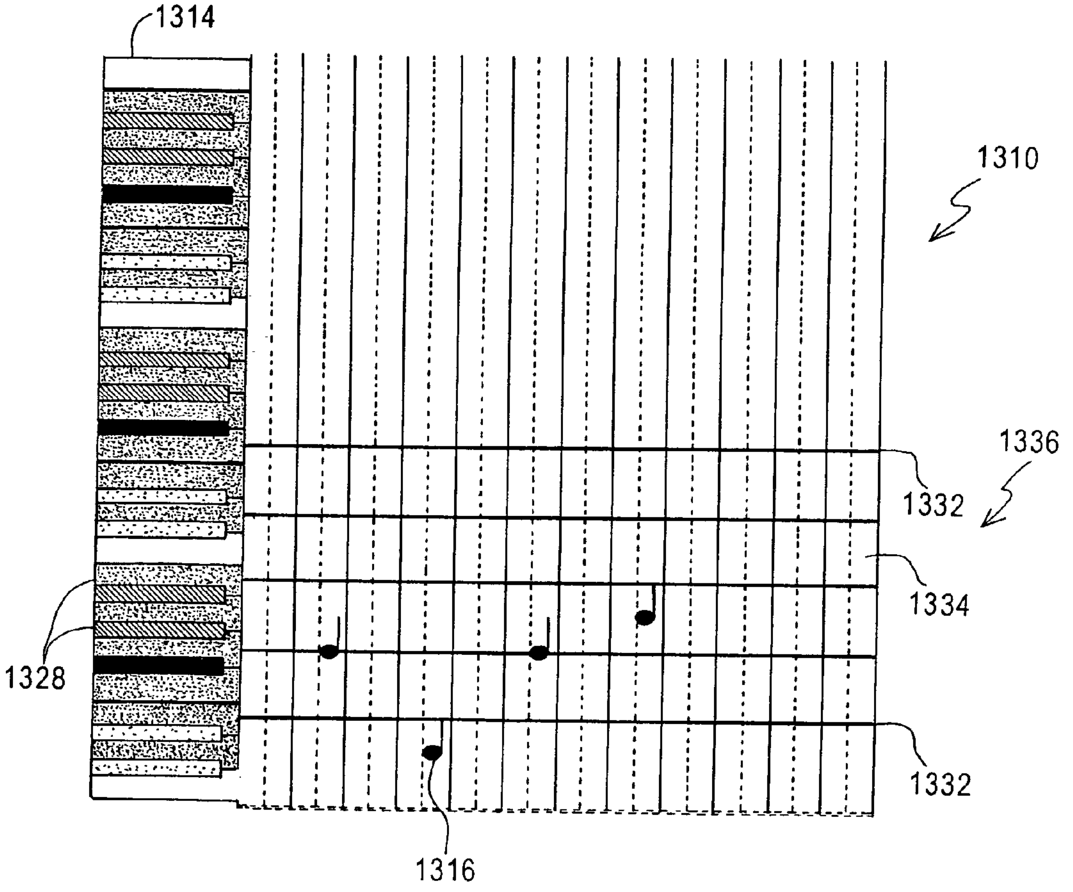
FIG. 15 shows the GUI of FIG. 13 in second position.

In FIG. 15, it is seen that the interface or screen 1310 transforms from a grid to a musical staff 1336. The trajectories along the grid panes 1326 transform into staff lines 1332 and corresponding spaces 1334. In this manner, the interface 1310 eventually assumes the traditional left to right reading view of standard musical notation. It is noted that at this stage of the game, the game objects or notes 1316 can still be colored and the virtual target keyboard 1314 still in view. However, as is apparent from FIG. 3, the keyboard 1314 orientation is now vertical.

Each of the modes of play will now be described.

A. Quick Play

Quick play allows playing the game without going through the challenges of the Career Mode (section 0). It allows for loading song files and playing them freely. Within the quick play a player can select either Training or Dynamic mode.

1. Quick Play Modes

After having selected a Quick Play, users are able to select between two different modes of play:

Training Mode

Training Mode allows a user to practice the game on any song that can be loaded into the game.

Dynamic Mode

Dynamic Mode is similar to a Training mode with the exception that there is a number of different dynamics that can be switched on and off. These dynamics pose an additional challenge. Each dynamic has a number of variables that can be adjusted and will gradually change on a player as the game is progressing. The following is an exemplary list of dynamics:

Gradual Tempo Adjustment: On|Off

Gradual Hit Window Closing: On|Off

Random Color Dropping: On|Off

Transform to Notation: On|Off

All of the above dynamic game elements are further defined under Starting Options in section 0, page 26.

2. Load Song

Load Song is a part of the game that involves loading a song stored locally on the computer's hard drive. Users are able to browse for a specific song on their hard drive through a file search or simplified song browser.

3. Internet Songs

Even though the invention will not be capable of loading songs directly off a Website into the game, it will feature a link that will open a web browser (e.g. Internet Explorer, or Netscape) to a section of the web site where more songs can be downloaded from. Users are able to download songs manually from a website and then open them from within the game. The link is provided on the splash screen.

B. Career Mode

Career mode allows a player to complete the game by going through different piano methods and levels, facing different challenges within levels.

1. Overview

Within Piano Methods (section 0) we have Levels (section 0). Levels have a predefined number of Challenges specified and available (section 0). One can apply any challenge from within the level to any song from within the level. The level is completed when the level requirements are met. The level requirements can be, for instance, to complete a minimum of 7 out of 10 songs, and apply a minimum of 3 out of 5 challenges for each song played. Once the level requirements are met, the next level is unlocked. Higher level scores can be achieved by doing more than a minimum requirement. Additional effort is rewarded with more points, and unlocking of additional graphic themes.

2. Profiles

Profiles are required to play the game in the career mode. Profiles keep track of the overall game progress in the career mode separately for each game user.

Create Profile

One of the first things a user must do, before he can start playing in the career mode, is to create a profile. Users are able to select an icon from a pool of available icons and assign it to their name, similar to the way users on Windows XP operating system can before they can start using the system. Then, the game will prompt for their name, and what mode they would like to start playing the game in, i.e. Beginner, Student, or Teacher. All the above information is saved onto the computer hard drive and kept there along with the entire game progress for that user.

Load Profile

If a user is returning to the game and has an existing profile already saved, he can choose his profile from a list of available profiles. This way one can continue playing, from where one left off last time.

Delete Profile

Users are able to delete existing profiles. A confirmation dialog will popup to make sure that profiles are not accidentally deleted.

3. Piano Methods

Users are able to select a piano method from a list of available methods. On the piano method selection screen, there is a top players list with their scores, number of levels completed, and total time spent on that method. Each piano method available for play is listed along with an icon, and some short text description of the method.

4. Levels

Users are able to select a level from within a piano method. Higher levels are unlocked by completing previous levels. The layout of the level selection screen are similar to piano method selection screen. Each level selection on the list is displayed with a brief description, and an icon. A top players list will also be displayed for each level highlighted for selection. Statistics of the progress accomplished on a level will also be displayed once a level is highlighted on a list. Exemplary statistics will include: total time spent playing, and a number of challenges completed so far within a level.

Each level has a predefined minimum number of songs and challenges that need to be completed in order to advance to the next level. Also, each level has a reward in form of a theme that can be unlocked when a level is completed.

5. Songs

Songs are the last item in the hierarchy of Methods and Levels. A number of songs are available for each level. Songs that are available within the career mode are preconfigured, and for instance, track editing is not allowed. Playing these songs is on an as-is basis without the ability to alter the game environment, like it is possible in a Quick Play mode described in section 0.

Songs that are available within piano methods can be in any file format that is supported by the invention. Songs available from within piano methods are irreplaceable from the operating system. In other words, users will not be able to replace these songs with ones that are less difficult, in order to score better in the game.

6. Challenges

The Game features a number of challenges for its users. The challenges are designed to assist in training in a variety of techniques. This invention will feature the following types of challenges:

Tempo

Starts at a 50% of the song file tempo and gradually increases. Bonus points are awarded at playing faster than default song file tempo. Players need to stay within the accuracy parameter to continue playing, i.e. 90%. Maximum allowed is a parameter that can be defined by the creator of the challenge.

Rhythmic Precision Challenge

Since the computer measures time in nanoseconds, there must be a time tolerance within which the human player can hit the correct key and still get credit. This tolerance can be expressed on the screen in length along the time line, and set at the beginning of a song.

In this challenge the hit window (set time tolerance) gradually closes to a challenge creator's predefined size. The starting size is a user definable parameter. Players need to stay within the accuracy parameter to continue playing.

Primary Beats

The challenge is to stay within a predefined accuracy level hitting primary beats. Primary beats are defined by the challenge creator. There is no penalty for hitting other (than primary beats) notes within the hit window.

Off-Beats

Similarly to Primary Beats challenge, Off-Beats Challenge requires to stay within a predefined accuracy level, hitting off-beats. There is no penalty for hitting other (than off-beats) notes within the hit window.

Color Drop Out

At selected or random times game colored objects representing notes are turned into black & white. The amount of game objects that lose color gradually increases as a song is progressing.

Note Duration (Legato)

The challenge is to hold down the piano keys for the correct duration of notes. Players need to stay within the accuracy parameter to continue playing, say 90%.

Rotation

The screen rotates from vertical to horizontal position. Players need to stay within the accuracy parameter to continue playing. As users master this challenge, they will learn the relationships between the keyboard and standard musical rotation.

Visibility

A series of visibility challenges are introduced to induce the player to memorize the piece of music that he/she is paying. For instance, a cloud could enter the game field and cover parts of the screen, making it difficult for a user to see the game objects. Visibility challenges are further defined during the development.

Loudness (Velocity)

Certain sections of a song will have different velocity parameters (forte, piano, etc.) that users need to stay within. Players need to stay within the accuracy parameter to continue playing. This challenge will only be available on touch-sensitive piano keyboards.

7. Creating Custom Piano Methods

Creating custom piano methods involves creating an empty method, naming it, creating levels within, and adding songs to levels. Custom piano methods do not include rewards, high-score lists or graphical themes. All challenges can be played on any song that is part of the custom piano method. Custom piano methods should be savable in a manner so that they can be copied and shared among users of the invention. Custom Piano methods are folders with files, and simple configuration files. All levels are unlocked and playable in custom piano methods. The idea of custom piano methods is to allow teachers for creating assignments for their students that are users of the invention.

C. Starting Options

Starting Options are options that can be configured before a user starts playing the game. The number of available starting options depends on the game mode. In some modes some options are not available, and are grayed out, or left out. However, regardless of what mode the game was started in, in order to start playing, one will have to go through these options. One exception to this rule is an Instant Play which omits configuring the Starting Options, and assumes all default values for playing. Preferred availability of Starting Options in different game modes is included in the CD-ROM Appendix.

The following is a list of all starting options along with brief descriptions:

Screen Orientation: V|H|Rotation

This option specifies the orientation of the screen. Some users may prefer to start the game play in a Vertical mode, whereas some will prefer the Horizontal mode. It is also possible to start the game play in a mode where the screen will gradually start rotating from Vertical to Horizontal orientation.

Annotation: On|Off

This switch turns annotations on/off. Annotations are included in the .amm internal file format and involve displaying a kind of "post-it" text notes on the game screen as annotated game objects scroll.

Fingerings: On|Off

This switch turns fingering information on/off. Similarly to annotations, fingerings are included in the .amm internal file format. When fingerings are enabled, game objects, if marked so, will display a number from 1 to 5 serving as a guide to a user as to what finger to use in order to target the game object correctly on the piano keyboard.

Freeze: On|Off

This switch enables or disables the ability to access a Freeze Menu from within the Game Play, as discussed hereinafter.

Beats per Screen

This option allows the user to select how many beats or measures are on the screen vertically during game play, allowing fast songs enough anticipation to prepare for the next note.

Objects: Long|Short|Notation

This option allows for selection between different types of game objects. Long objects are those that can be drawn to represent the actual durations of musical notes, for instance: caterpillars. Whereas, short objects are those that only represent the starting point of a musical note, and do not represent the duration, i.e. Soccer Balls or Balloons. When Notation is selected, instead of game objects a user will see musical notation during the Game Play.

Notation: Accidentals|Key Signature

This option allows for selection between different types of musical notation. It is only available if Notation is selected as a game object.

Theme Selection

Theme selection is a set of GUI elements that allow for selection of different game themes. Themes include backgrounds and different game objects. Different backgrounds can be combined with different game objects. However, themes that were not yet unlocked in the Career Mode (section 0) are not available for selection.

Color: On|Off

This switch turns on/off the color of the game objects as well as the color of the virtual piano keyboard on the screen. Basically, if toggled ON—all game objects and piano keys are displayed color-coded, otherwise, these objects are black & white.

Track(s) Select (incl. Range Preview, Active Keys)

This section allows for a visual selection of the tracks in a loaded song file. Once a song is loaded, a list of available tracks are displayed, and a user will have the ability to select those tracks that he/she wishes to play in the game. Once a track is selected by a user, the program will automatically find the range of musical notes for it, and mark it on the piano keyboard displayed on the screen (i.e. C2–B3). The range will always be calculated for all selected tracks. For instance, if two tracks are selected: track1 and track2—the range is marked for both as if these were one track. Previewing the range is important because it allows a user to see if range of selected tracks fits onto the attached MIDI keyboard. i.e. playing a piece that spreads across 6 octaves on a keyboard that only has 4 would be virtually impossible. Additionally users are able to click on individual piano keys and mark them as active or inactive. By default all keys in the range are marked active. During the Game Play user assumes responsibility for hitting only those piano keys that are active.

Instrument Select for Track(s)

Users are given the ability to change General MIDI instruments for any of the selected tracks that are to be played in the game. Users can simply select one instrument per track from a drop down menu of 128 General MIDI Level 1 Instruments.

Accompaniment Track(s) Select

Users are also given the ability to select accompaniment tracks for the songs that they wish to play for the game. Accompaniment tracks are played audibly in the background. Some will find accompaniment helpful, while others distracting, therefore these selections are optional.

Instrument Select for Accompaniment Track(s)

Similarly to selecting instruments for the tracks to be played in the game, users are given the ability to change General MIDI instruments for any of the selected accompaniment tracks. Users can simply select one instrument per accompaniment track from a drop down menu of 128 General MIDI Level 1 Instruments.

Merging Selected Tracks

This option allows merging together a number of selected tracks into one. This operation does not alter the content of the original file, instead it is performed in the computer's memory on the file loaded.

Delete Track(s)

Deletes selected track(s) from memory. Deleted track(s) are not deleted from a song file.

Split Hands for a track

If only one track is selected, this option is enabled. Executing this option splits a single track into two tracks with musical content arranged separately for both hands. I.e. The first track holds musical notes to be played with a left hand, and the second track is to be played with a right hand.

Transpose Selected Track(s)

This option transposes selected track(s) by semitones either up or down.

Track Setup

This section allows a user to configure MIDI output ports and channels for any track of the file loaded. For instance, a user might prefer to hear an accompaniment track #2 on the $11^{th}$ channel of a synthesizer located on the $3^{rd}$ MIDI port.

Metronome: On|Off

This switch enables or disables the audible metronome heard during the game play.

Practice Challenge Selection

This section allows for selecting a challenge from all the challenges that are built into the game, and are part of the Career Mode, as discussed earlier. By allowing this, users can flexibly practice different challenges on any song they wish to.

Tempo Select

This option allows for a selection of a tempo that is used during the game play. Part of this option is a switch called "MIDI tempo: On|Off" that enables playing at a tempo specified in the currently loaded song. If this switch is enabled and a current song file features variations in tempo, the game speed will adjust automatically.

Hit Window Adjustment

This option allows for adjusting the height of the hit window of the game.

Background: On|Off|Opacity %

An option that enables, disables or allows for an adjustment of opacity of the background. Opacity values range from 0% to 100%.

Measure: On|Off

This switch enables or disables the visual measurement that scrolls along with the game objects.

Object Guides: On|Off

This switch enables of disables visible trajectories guide lines.

Stats (Overlays): On|Off

This switch turns on or off on-screen game statistics, score, etc.

Keyboard: Auto|2 oct.|4 oct.|5 oct.

This option allows for selecting the size of the on-screen keyboard used in the game play. Users can select between 2-octave, 4-octave or 5-octave versions of keyboards. Automatic keyboard size selection is also available. The game will support three keyboard sizes: 2-, 4-, and 5-octave.

Starting Key Selection

This option allows for selecting the starting key on the on-screen keyboard. This is very helpful in calibrating the physical MIDI keyboard with the on-screen keyboard if the two are of a different size. The selections are: C0, C1, C2 . . . C11.

Gradual Tempo Adjustment: On|Off

Enabling this option will gradually increase or decrease the tempo of the game play to the tempo specified in a loaded song file. For instance, by starting the game play at a low tempo, users can practice a piece of music at a slowly, but constantly increasing tempo.

Gradual Hit Window Closing: On|Off

Enabling this option will gradually decrease the height of the hit window during the game play. For instance, by starting the game play at a hit window wide open, users can practice a piece of music with a slowly, but constantly increasing precision.

Random Color Dropping: On|Off

If this option is enabled, during the game play, game objects will start losing color selectively or at random, making it harder to color-coordinate game objects with the color-coded piano keyboard. Both game objects and the keys on the on-screen keyboard can drop colors.

Transform to Notation: On|Off

Enabling this option will gradually transform game objects into musical notation.

Loop Song: On|Off

Enables or disables looping of a song in the game play.

Lyrics: On|Off

If a song file includes lyrics and this option is enabled, lyrics will appear on the screen.

Auto Save Song: On|Off

This option enables or disables auto-saving of all alternations to a currently loaded song. If auto save song is enabled, a user is prompted for a new file name for a song. Songs are saved into an .amm internal song file format.

SFX Volume & Music Volume

These options are implemented in form of sliders and allow for adjusting volume levels of both, sound effects and the music.

Extract Part

This is a hybrid of a track merge option. A user chooses the clefs (tracks) to be merged.

Prepare Sing Along Part

This option is merely separating out the text into measures, for someone to sing along without the notation being on the same sheet.

Prepare Fake Book Lead sheet

"Fake" books are collections of popular songs with the lyrics and the chord names (Gm7) for jazz players, and maybe the lead melody, and they would improvise the rhythm and harmonic parts, using the melody and chord structure as a skeleton. MidiNotate software extracts the lyrics, lead melody, and chord names from a midi file, and allows for printing it in this manner.

Transcribe Chord Names

Chord names have multiple ways of being described. An example might be A Major. It could be written simply A or it might be written as A maj.

All of the above options can be combined into groups. For instance there is a large amount of Boolean options (two state, on|off) that are implemented as check boxes in the GUI of the game.

D. Game Play

This is where all the action happens. Game play is the actual game.

1. Keyboard Shortcuts

There is a number of exemplary keyboard shortcuts linked to different options, which can be invoked during the game play without stopping the flow of the game. Other options are possible. These options are:

| | |
|---|---|
| Tempo Adjustment | Arrow Left \| Arrow Right |
| Hit Window Adjustment | Arrow Up \| Arrow Down |
| Warning Line Adjustment | Shift + Arrow Up \| Shift + Arrow Down |
| Overall Volume Adjustment | Gray + \| Gray − |
| Metronome | M |

Some adjustments are not available in some challenges, e.g. tempo adjustment is not available during the game play in tempo challenge.

2. Missed Notes

Whenever a player misses a note, a mark is placed onto the game field. Users are able to scroll up and down the entire song from within the freeze menu and see where they have missed.

3. Musical Notation

The invention is capable of transforming MIDI files into a musical notation to be displayed on the screen during the game play. Examples of software suitable for implementing this function can be found at:

| | |
|---|---|
| Notation Technologies | http://www.notationtechnologies.com/ |
| Notation Software, Inc. | http://www.notation.com/ |

4. Game Objects

The invention features a number of game objects, also known as Sprites. All game objects will feature 32-bit color and alpha-blending support. The game objects are two dimensional, but drawn on the screen using 3D techniques in order to take advantage of hardware accelerated 3D drawing. This will allow for an easy scaling, rotating and alpha-blending.

5. On-screen Piano Keyboard

The on-screen piano keyboard comes in three different sizes: 2-, 4-, and 5-octave. Depending on the keyboard size selected, size of the game object will change accordingly to keep the width proportional to the width of the on-screen keyboard keys.

6. Point Scoring

The game rewards users with points for correctly hit musical notes, playing with different dynamic options enabled, and for playing different challenges, and so on.

E. Freeze Menu

Freeze Menu can be invoked from within the game play only. It will allow for alternation of some of the game parameters, making annotations on the screen and saving a currently played song into an internal file format along with all annotations, highlighting and fingering information.

1. Invoking

The freeze menu is invoked by pressing an ESC key on the keyboard from within the game play. Once ESC is pressed the following happens: the entire game freezes, vertical scrollbar appears on the screen to allow scrolling through the entire song both, back to the parts already played, and ahead. Note that scrolling, annotating, highlighting or fingering is not available when the game screen is in the middle of a rotation. Once the game is frozen, a translucent help box is displayed with directions as to what can be done on the screen. For instance, a typical text would read: "To create an annotation on the game screen, click on an empty space".

2. Highlighting and Fingering

When a user clicks on any game object, a pop-up menu, similar to the one illustrated below, will appear next the object:

| Highlight: | | | | | | x |
|---|---|---|---|---|---|---|
| Fingering: | L<br>1<br>R<br>1 | L<br>2<br>R<br>2 | L<br>3<br>R<br>3 | L<br>4<br>R<br>4 | L<br>5<br>R<br>5 | x |

From within that pop-up menu users can select the highlight color or a fingering number for either of hands, just by clicking on squares (as illustrated above). Whatever selection was made on the pop-up menu, it would be applied to the object that was clicked on. Highlighting should be done in form of a halo effect around the object. Colors illustrated on the pop-up menu above, are for illustration purposes only. Additionally, if an object has already a fingering or a highlighting assigned, those can be removed by clicking on "x" buttons as illustrated above.

3. Annotating

Users are able to place notes on the game screen. Those annotations later become a part of the .amm file. Annotations once placed on the game screen are remembered in the file if desired (save). Users can add and remove annotations. Annotations are placed on the screen in a form of speech balloons. There are a number of balloon shapes to choose from. In order to add an annotation to the game screen, a user would click on an empty space on the screen. Once clicked, a popup menu will appear allowing for selecting the shape of the speech balloon and the direction of its arrow-pointer. The text would be entered then through a text edit box. Annotations can be removed from the game screen. In order to remove an annotation one would have to click on an already existing annotation, and then click on an "x" button that would appear next to it. The game will also allow for editing already entered annotations. In order to edit an annotation, similarly to deleting one, a user would have to click on an already placed annotation and then click on an "edit" button that would appear next to it. Editing annotations are done in the same way as entering them.

4. Freeze Menu Options

The number of options in the freeze menu is dependent on the game mode. For a preferred availability of freeze menu options in different game modes please see Attachment B. Freeze menu options are listed below. It is worth noting that a significant number of these options are a subset of Starting Options, which have been defined in section C above. Definitions of already defined options are omitted here.

Fingerings: On|Off

Objects: Long|Short|Notation

Notation: Accidentals|Key Signature

Theme Selection

Color: On|Off

Track(s) Select (incl. Range Preview, Active Keys)

Instrument Select for Track(s)

Accompaniment Track(s) Select

Instrument Select for Accompaniment Track(s)

Transpose Selected Track(s)

Metronome: On|Off

Tempo Select

Hit Window Adjustment

Background: On|Off|Opacity %

Measure: On|Off

Object Guides: On|Off

Stats (Overlays): On|Off

Starting Key Selection

Gradual Tempo Adjustment: On|Off

Gradual Hit Window Closing: On|Off

Random Color Dropping: On|Off

Transform to Notation: On|Off

Loop Song: On|Off

Lyrics: On|Off

SFX Volume & Music Volume

Auto Save Song: On|Off

Turns On or Off auto saving song feature. If this option is enabled, songs are automatically saved into a previously specified file as changes are made.

Save Song As . . .

Prompts for a file name; saves a current song into an .amm file.

F. Game Setup

Game setup can be invoked from the main menu. The following are its options:

Menu Options: Advanced|Beginner

This menu option allows selecting between two different sets of menu options in the game. Advanced set is designed for users who want to take the game to the fullest and require maximum flexibility, whereas Beginner set eliminates a number of menu options that are simply too complex for an average user, or a child.

Gamma Correction

This option allows adjusting the gamma value of the screen.

Midi In Select

This menu option allows for selection of the MIDI input port for the game. The game will enumerate all possible MIDI ports on the system and make them available for selection.

Midi Out Select

This menu option allows for selection of the MIDI output port for the game. The game will enumerate all possible MIDI ports on the system and make them available for selection.

Game Detail Level: Small|Medium|High

Game detail level enables and disables some of the CPU intensive game visual effects. Small level of detail will make it possible to run the game on a low-end computer at the price of visual effects and overall eye-candy.

Music & SFX Volume Level

These menu options in form of sliders adjust the overall sound mixer values for the game. SFX Volume option allows for an adjustment of the overall volume level of all .wav sounds played in the game (PCM channels of the sound card), whereas Music Volume allows for an adjustment of the overall volume level of the internal sound card synthesizer. Both sliders can be assigned values from 0% to 100%.

Keyboard Range Configuration

This is an option that will determine the size of the keyboard attached to the computer. A user is asked to press the very left and the very right key on the MIDI keyboard, and the game will calculate the octave size of the keyboard.

Velocity Test

This option will allow one to test a user's MIDI keyboard to determine whether it is velocity sensitive or not. A user is asked to strike a key on the MIDI keyboard twice, first gently, and hard the second time. Based on the difference in value of the received MIDI velocity message, the program will determine if a user has a touch-sensitive keyboard.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A method of instructing a user to read musical notation through interaction with a graphical user interface and an input keyboard, comprising the steps of:

generating the graphical user interface, having a first position, including a virtual keyboard positioned substantially at a top portion of the graphical user interface, the virtual keyboard having a plurality of keys corresponding to at least one octave and displayed in an orientation corresponding to the manner in which the keys are to be normally played with each key having a back portion substantially at a top of the graphical user interface and an opposed lower front portion, each key of the virtual keyboard having a corresponding key on the input keyboard;

incorporating a music file into the graphical user interface, wherein the music file contains data corresponding to an arrangement of at least a first and a second musical note in sequence, having a rhythmic pattern;

directing a first game object, representing the first musical note in the arrangement, upward, in a first substantially straight trajectory, toward the opposed lower front portion of a first key on the virtual keyboard, corresponding to the first musical note, such that the first game object will experience a first collision with the virtual keyboard in alignment with the first key;

directing a second game object, representing the second musical note in the arrangement, upward, in a second substantially straight trajectory, toward the opposed lower front portion of a second key on the virtual keyboard, corresponding to the second musical note, such that the second game object will experience a second collision with the virtual keyboard in alignment with the second key, according to the rhythmic pattern of the arrangement;

awarding a value to the user based upon the user striking the corresponding key on the input keyboard within a set time tolerance hit window;

rotating the graphical user interface to a second position, approximately ninety (90) degrees counterclockwise, once a predetermined threshold of user performance has been met, such that the virtual keyboard is positioned substantially on a left side of the graphical user interface, and the first and second game objects move along the first and second substantially straight trajectories toward the virtual keyboard; and introducing a series of visible staff lines defining spaces, where the lines and spaces correspond to the straight trajectories along which the game objects travel toward the virtual keyboard, such that the game objects travel along either the lines or the spaces, until colliding with the virtual keyboard in alignment with the corresponding key.

2. The method of claim 1, further comprising the step of morphing the game objects into classical musical notation.

3. A method of instructing a user to read musical notation through interaction with a graphical user interface and an input keyboard, comprising the steps of:

a) generating the graphical user interface, having a first position, including a virtual keyboard positioned substantially at a top portion of the interface, having a plurality of keys, each key having a corresponding key on the input keyboard;

b) incorporating a music file into the graphical user interface, wherein the music file contains data corresponding to an arrangement of a plurality of musical notes in sequence, having a rhythmic pattern, each note being represented by a game object;

c) directing the game objects upward, in substantially straight trajectories, toward keys on the virtual keyboard corresponding to the musical notes;

d) colliding the game objects with the corresponding keys according to the rhythmic pattern of the arrangement;

e) awarding a value to the user based upon the user striking the corresponding key on the input keyboard approximately simultaneously with the collisions; and f) rotating the interface to a second position, approximately ninety (90) degrees counterclockwise, once a predetermined threshold of user performance has been met, such that the virtual keyboard is positioned substantially on a left side of the interface, and the game objects continue to move along the substantially straight trajectories toward the virtual keyboard.

4. The method of claim 3, further comprising the step of introducing a series of visible staff lines defining spaces, where the lines and spaces correspond to the straight trajectories along which the game objects travel toward the virtual keyboard, such that the game objects travel along either the lines or the spaces, until colliding with the virtual keyboard at the corresponding key.

5. Apparatus for facilitating learning to play a musical keyboard comprising:

a computing element linked to the musical keyboard;

a display linked to the computing element and viewable by a user of said musical keyboard; and software for execution on said computing element linking a virtual keyboard displayed at a top portion of said display when the software is executed by the computing element with actions by the user of said musical keyboard, the virtual keyboard having a plurality of keys corresponding to at least one octave and displayed in an orientation corresponding to the manner in which the keys are to be normally played with each key having a back portion substantially at a top of the display and an opposed lower front portion, the software directing the carrying out of:

loading a music file, the music file containing data corresponding to an arrangement of musical notes of a musical piece, progressing a plurality of game objects, representing the musical notes and being other than musical notation, from a lower end portion of the display upward, in a substantially straight trajectory, toward the opposed lower front portions of respective keys on the virtual keyboard, such that the plurality of game objects will experience a collision with the virtual keyboard in alignment with the respective keys which correspond to keys of the musical keyboard that are to be engaged by the user in order to play the musical piece on the musical keyboard, and rotating, at a predetermined user performance threshold, trajectories of the game objects from vertical where the game objects progress from the lower end portion of the display upward, toward the opposed lower front portions of the respective keys of the virtual keyboard that is displayed at the top portion of the display to horizontal where the game objects progress from a right end portion of the display leftward, toward the opposed lower front portions of the respective keys of the virtual keyboard that is displayed in an orientation corresponding to being moved counter-clockwise from the top portion of the display to substantially a left end portion of the display, wherein during a portion of the time that the music file is loaded, the plurality of game objects and the plurality of keys of each octave of the virtual keyboard are displayed color-coded with each other in a one-to-one correspondence.

6. The apparatus of claim 5, wherein the software further directs the carrying out of:

morphing of the plurality of game objects into musical notation.

7. The apparatus of claim 6, wherein, during another, later portion of the time that the music file is loaded, the musical notation and the plurality of keys of the virtual keyboard are displayed in black and white.

8. The apparatus of claim 7, wherein, prior to the other, later portion of time, where the musical notation and the plurality of keys of the virtual keyboard are displayed in black and white, there is a transition period in which some musical notation and some of the plurality of keys of each octave of the virtual keyboard are displayed color-coded with each other in a one-to-one correspondence while the remainder of the musical notation and the remainder of the plurality of keys of each octave of the virtual keyboard are displayed in black and white.

9. A method using a computer in providing musical instruction comprising the steps of:

linking a musical keyboard and a display to the computer;

generating a virtual keyboard having a plurality of keys corresponding to at least one octave and displayed substantially at a top portion of the display in an orientation corresponding to the manner in which the keys are to be normally played with each key having a back portion substantially at a top of the display and an opposed lower front portion;

loading a music file, the music file containing data corresponding to an arrangement of musical notes of a musical piece stored in a computer readable format;

progressing a plurality of game objects, representing the musical notes and being other than musical notation, from a lower end portion of the display upward, in a substantially straight trajectory, toward the opposed lower front portions of respective keys on the virtual keyboard, such that the plurality of game objects will experience a collision with the virtual keyboard in alignment with the respective keys which correspond to keys of the musical keyboard that are to be engaged by the user in order to play the musical piece on the musical keyboard; and rotating, at a predetermined user performance threshold, trajectories of the game objects from vertical where the game objects progress from the lower end portion of the display upward, toward the lower portions of the respective keys of the virtual keyboard that is displayed at the top portion of the display to horizontal where the game objects progress from a right end portion of the display leftward, toward the lower portions of the respective keys of the virtual keyboard that is displayed in an orientation corresponding to being moved counter-clockwise from the top portion of the display to a left end portion of the display, wherein during a portion of the time that the music file is loaded, the plurality of game objects and the plurality of keys of each octave of the virtual keyboard are displayed color-coded with each other in a one-to-one correspondence.

10. The method of claim 9, further comprising the step of:

morphing of the plurality of game objects into musical notation.

11. The method of claim 10, wherein during another, later portion of the time that the music file is loaded, the musical notation and the plurality of keys of the virtual keyboard are displayed in black and white.

12. The method of claim 11, wherein prior to the other, later portion of time, where the musical notation and the plurality of keys of the virtual keyboard are displayed in black and white, some musical notation and some of the plurality of keys of each octave of the virtual keyboard are displayed color-coded with each other in a one-to-one correspondence while the remainder of the musical notation and the remainder of the plurality of keys of each octave of the virtual keyboard are displayed in black and white.

13. A system to for facilitating learning to read musical notation on a standard staff, comprising:

a musical keyboard;

a computing element functionally linked to the musical keyboard;

a display, functionally linked to the computing element, viewable by a user of the musical keyboard;

a virtual keyboard displayed substantially at a top portion of the display, the virtual keyboard having a plurality of keys and displayed in an orientation corresponding to the manner in which the keys are to be normally played with each key having a back portion substantially at a top of the display and an opposed lower front portion; and computer instructions, accessible by the computing element, configured to instruct the computing element to:

load a music file, the music file including data corresponding to an arrangement of musical notes, and progress a plurality of game objects upward on the display toward the opposed lower front portions of respective keys on the virtual keyboard, and rotate, at a predetermined user performance threshold, the progression of the plurality of game objects and the virtual keyboard from a first orientation wherein the plurality of game objects are progressed upward toward the opposed lower front portions of respective keys on the virtual keyboard displayed at the top of the display to a second orientation wherein the plurality of game objects are progressed leftward toward the opposed lower front portions of the virtual keyboard displayed at a left end of the display.

14. A method of using a computer for facilitating learning to read musical notation on a standard staff, comprising the steps of:

displaying a graphical user interface, having a first position, wherein there is displayed a virtual keyboard positioned substantially at a top portion of the graphical user interface, the virtual keyboard having a plurality of keys corresponding to at least one octave of a musical keyboard with each key having a back portion substantially at a top of the graphical user interface and an opposed lower front portion;

progressing a plurality of game objects, representing an arrangement of musical notes, upward toward respective keys on the virtual keyboard such that the plurality of game objects will experience a collision with the virtual keyboard in alignment with the respective keys on the virtual keyboard; and rotating, at a predetermined user performance threshold, the graphical user interface counter-clockwise to a second position such that the virtual keyboard is positioned substantially on a left side of the interface and the plurality of game objects move leftward toward the virtual keyboard.

* * * * *